Patented Feb. 12, 1929.

1,702,103

UNITED STATES PATENT OFFICE.

HENRY BLUMENBERG, JR., OF LOS ANGELES, CALIFORNIA.

PACKING MATERIAL FOR FRUITS.

No Drawing. Application filed February 14, 1927, Serial No. 168,237. Renewed December 22, 1928.

My invention relates to a packing material for fruits.

It is an object of this invention to provide an efficient, inexpensive, antiseptic, germicidal packing material for fruits and the like.

I have discovered that if cellular material such as sawdust, kieselguhr, finely ground asbestos, rice hulls, powdered pumice stone or granular carbon are intimately associated with an active fluorine compound it serves as an excellent packing material for preserving fruit and the like for a long time by preventing the formation of bacterial attack or the growth of fungi.

My invention consists in the composition of matter hereinafter described and claimed.

I take any one of the cellular materials mentioned above, either alone or in combination with one or more of the others, and impregnate the same with an aqueous solution of ammonium sulphate. I then add with the cellular material, which is in a condition of partial dryness, finely ground calcium fluoride, preferably of 300 mesh or finer, and mix the same intimately with the cellular material. There is a slow chemical reaction, forming ammonium fluoride and calcium sulphate in accordance with the following equation:

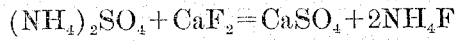

$$(NH_4)_2SO_4 + CaF_2 = CaSO_4 + 2NH_4F$$

The respective amounts of ammonium sulphate and calcium fluoride are taken in accordance with the chemical equation, but no harm is done if there is an excess of one or the other. I prefer to take a slightly greater amount of the calcium fluoride than required by the equation, especially in view of the fact that calcium fluoride usually contains silica up to 10 per cent. The hydrofluoric acid formed will react on the silica forming a siliceous gel which appears to be useful in retarding the escape of the hydrofluoric acid.

The amount of ammonium sulphate and calcium fluoride to be mixed with the cellular material may vary within wide limits, but ordinarily from 2 to 10 per cent by weight of the combined reagents is sufficient.

In place of ammonium sulphate ammonium chloride may be used, in which case calcium chloride in place of calcium sulphate will be formed, which, because of its hygroscopic properties, may be in some instances preferable for the reason that it will assure a sufficient quantity of moisture to be present which is necessary for the reaction.

If a more active germicidal and antiseptic agent is required the calcium fluoride may be replaced by the more expensive sodium fluoride.

In place of the reagent above described any other soluble fluorine compound may be substituted as a germicidal and antiseptic agent, including boro fluorides and silico fluorides, the latter of which are substantially non-poisonous.

Various changes may be made in the steps of the process by those skilled in the art without departing from the spirit of my invention as claimed.

I claim:

1. An antiseptic packing composition containing cellular material associated with calcium fluoride and an ammonium salt capable of reacting with the calcium fluoride to form ammonium fluoride.

2. An antiseptic packing composition containing cellular material associated with ammonium sulphate and calcium fluoride.

3. An antiseptic packing composition containing a cellular material impregnated with an aqueous solution of ammonium sulphate and mixed with powered calcium fluoride.

4. An antiseptic packing composition containing sawdust impregnated with an aqueous solution of ammonium sulphate and powdered calcium fluoride.

In testimony whereof I have signed my name to this specification.

HENRY BLUMENBERG, JR.